United States Patent [19]

Ota et al.

[11] Patent Number: 4,888,606
[45] Date of Patent: Dec. 19, 1989

[54] PHOTOGRAPHIC APPARATUS HAVING A SELF-MONITORING DEVICE

[75] Inventors: Kenshiro Ota, Osaka; Yoshio Namiki, Yokohama, both of Japan

[73] Assignee: Daicolo Co., Ltd., Osaka, Japan

[21] Appl. No.: 265,356

[22] Filed: Oct. 27, 1988

Related U.S. Application Data

[63] Continuation of Ser. No. 940,367, Dec. 11, 1986, abandoned.

[51] Int. Cl.$^4$ .............................................. G03B 15/06
[52] U.S. Cl. ...................................... 354/76; 354/290; 358/909
[58] Field of Search ...................... 354/75, 76, 80, 126, 354/290, 291, 412; 358/906, 909

[56] References Cited

U.S. PATENT DOCUMENTS

| | | | |
|---|---|---|---|
| 3,883,883 | 5/1975 | Sano et al. | 354/75 |
| 4,303,322 | 12/1981 | Someya | 354/432 |
| 4,560,261 | 12/1985 | Ueda et al. | 354/195.12 X |
| 4,618,239 | 10/1986 | Sakamoto | 354/76 |
| 4,738,526 | 4/1988 | Larish | 354/412 |
| 4,757,388 | 7/1988 | Someya et al. | 358/909 |

*Primary Examiner*—L. T. Hix
*Assistant Examiner*—David M. Gray
*Attorney, Agent, or Firm*—Edwin E. Greigg

[57] ABSTRACT

A photographic apparatus having a self-monitoring device, comprising a still camera, a TV camera, a monitor TV for visualizing a vedeo signal corresponding to an image photographed by the TV camera, and means for producing a mirror image of a photographic object to be visualized on the monitor TV. The still camera and the TV camera shares a photographic lens. The still camera, TV camera and monitor TV are housed in one casing. The monitor TV has a screen facing the same direction as the photographic lens faces. The person who is the object to be photographed can monitor the image appearing on the monitor TV screen, adjust his pose or the like and take a photograph to his satisfaction.

30 Claims, 7 Drawing Sheets

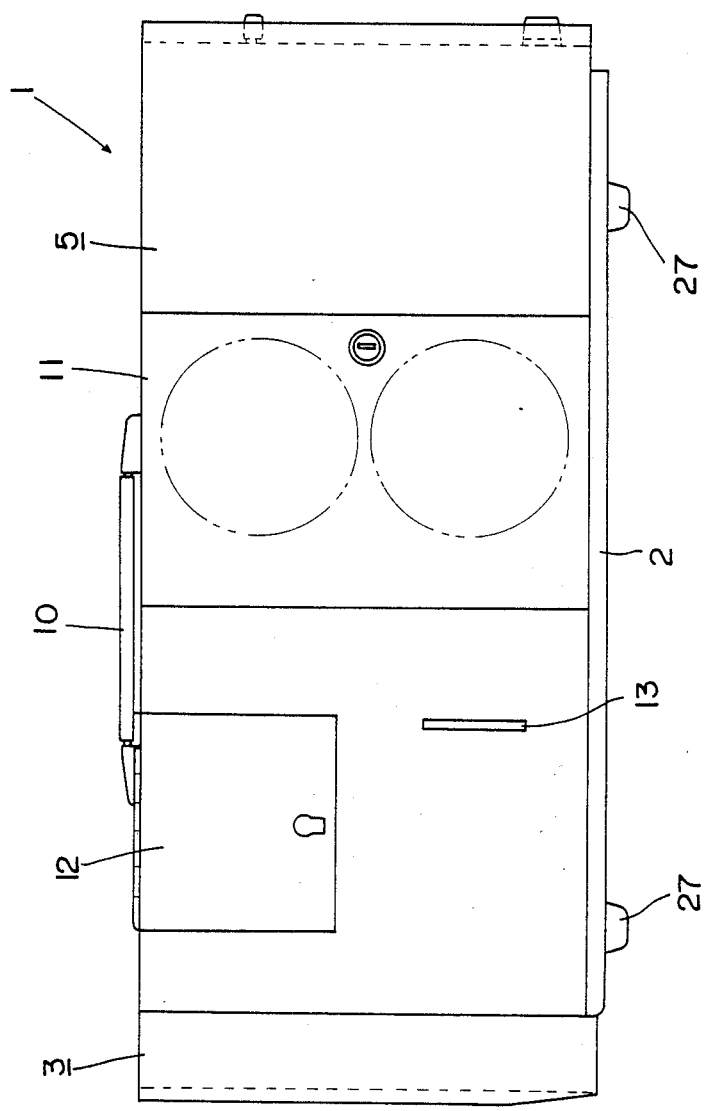

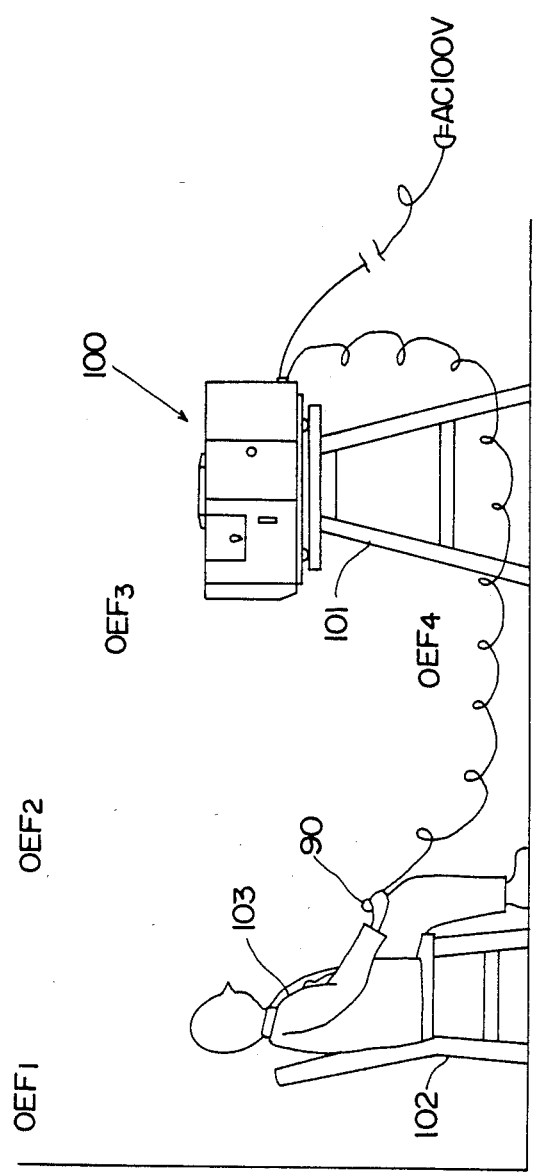

PHOTOGRAPHIC APPARATUS HAVING A SELF-MONITORING DEVICE

This is a continuation of copending application Ser. No. 940,367, filed Dec. 11, 1986, now abandoned.

BACKGROUND OF THE INVENTION

(1) Field of the Invention

The present invention relates to a photographic apparatus having a self-monitoring device and suited for photographing individual persons for filing in albums or for use on visiting cards or certificates.

(2) Description of the Prior Art

It is conventional practice to use a still camera such as an ordinary single-lens reflex camera for this kind of photography. The photographer looks through the viewfinder, determines the composition for an object or person to be photographed and selects a right moment to release the shutter.

There also is a remote control camera for bird watching and other purposes in which a camera's viewfinder image is reproduced on a monitor TV screen. Here again, the photographer monitors the image and selects a right moment to release the shutter.

Furthermore, an automatic photographic apparatus is known which enables the user to take his own photographs for use on an identity card or the like. But with this photographic apparatus the user is unable to monitor the photographic image prior to photograph taking.

Thus, none of the existing cameras or photographic apparatus permit the user, who is the object to be photographed, to ascertain and, if necessary, correct the composition, his garment conditions and his pose by monitoring the image to be photographed. Therefore, good photographs are not always assured.

Particularly where many people are photographed one after another such as for taking photographs of individuals to make an album in commemoration of graduation from school, to print on visiting cards for business use or to use on identity cards, the photographing efficiency is poor because time is consumed in preparing for taking a photograph of each person.

It is conceivable to direct the monitor TV of the conventional remote control camera toward the person to be photographed, to permit him to monitor the photographic image himself. But this would not only require a large and complicated apparatus, but have the problem that the person who is the photographic object tends to cast his eyes away from the camera since the camera and the monitor TV are spaced from each other, which would result in a photograph of the person looking sideways.

Furthermore, since the conventional monitor TV presents a real image with the righthand side appearing on the righthand side and the lefthand side on the lefthand side (as opposed to a mirror image), the photographer cannot monitor his image as though looking in a mirror. This has the disadvantage of making the adjustment of composition and pose difficult.

SUMMARY OF THE INVENTION

An object of the present invention is to provide a photographic apparatus having a self-monitoring device which is free from the problems noted above.

In order to achieve this object, a photographic apparatus having a self-monitoring device according to the invention comprises a still camera, a TV camera sharing a photographic lens with the still, camera, a monitor TV for visualizing a video signal corresponding to an image photographed by the TV camera, the still camera, TV camera and monitor TV being housed in one casing, the monitor TV having a screen facing the same direction as the photographic lens faces, and means for producing a mirror image of a photographic object to be visualized on the monitor TV.

The photographic apparatus having a self-monitoring device and constructed as described above constitutes a single, compact apparatus since all its components are contained in a single casing, which is easy to carry and very simple to set and operate.

This apparatus permits the operator, who is the object to be photographed, to monitor the image on the monitor TV screen without parallax and to adjust his pose with ease as though by looking in a mirror. There is hardly any possibility of a resulting photograph showing the person looking sideways since the photographic lens and the monitor TV screen are disposed close to each other. These features enable good photographs to be taken in a short time. Therefore, a great number of people may be photographed one after another with greatly increased efficiency.

Since this apparatus is easy to carry, it may conveniently be taken out to a place of photography. It is also possible, for example, to set up a handy studio on an automobile with ease and visit offices and schools to take photographs on the spot.

Other objects and advantages of the invention will be apparent from the following description.

BRIEF DESCRIPTION OF THE DRAWINGS

FIG. 4 is a righthand side view of the photographic apparatus, FIG. 9 is an illustration showing one example of photographing mode using the photographic apparatus according to the present invention.

DESCRIPTION OF THE PREFERRED EMBODIMENT

An embodiment of the present invention will be described hereinafter with reference to the accompanying drawings.

Figure 1:
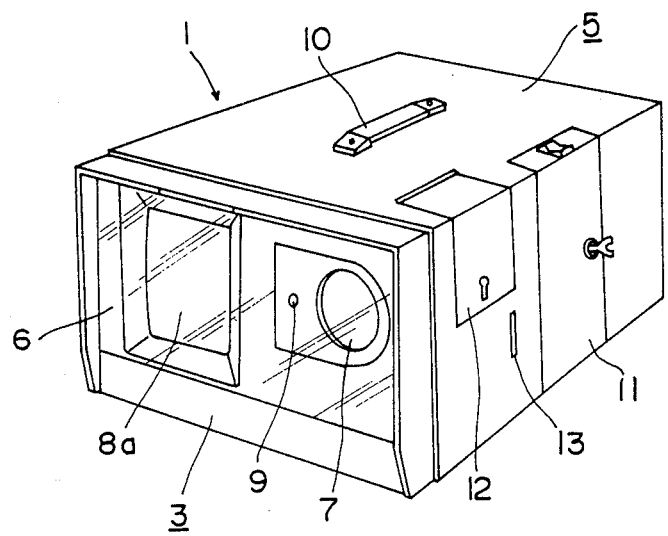
FIG. 1 is a perspective view of a photographic apparatus embodying the present invention.
Figure 2:
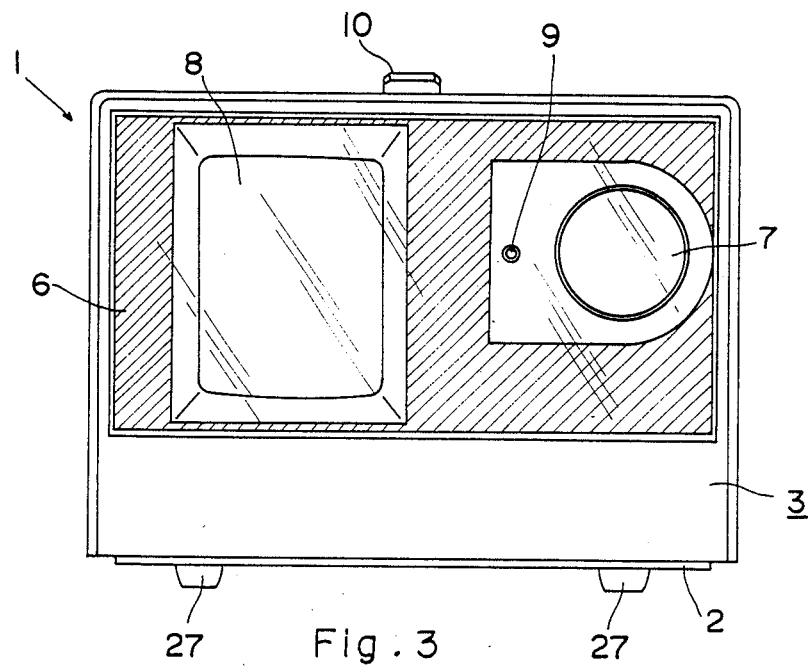
FIG. 2 is a front view of the photographic apparatus.
Figure 3:
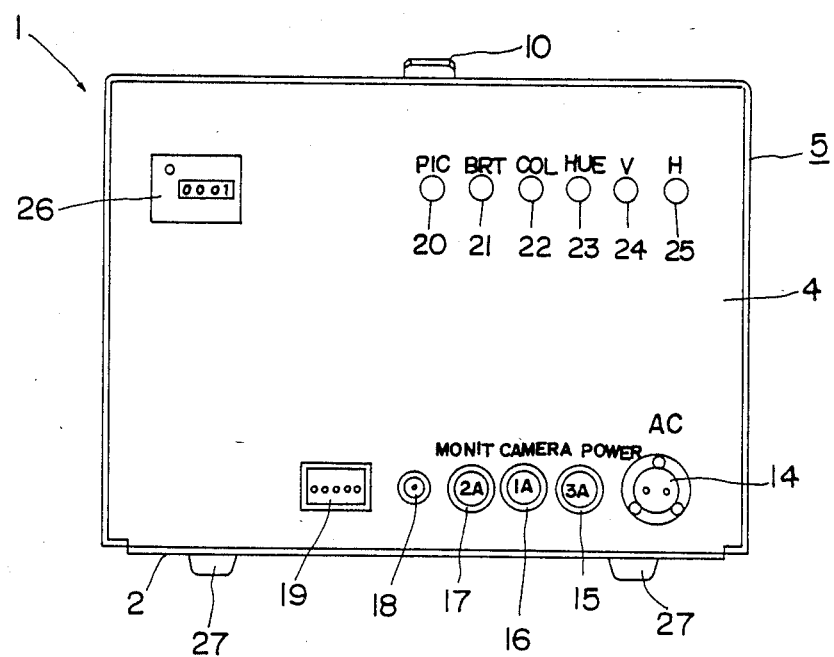
FIG. 3 is a rear view of the photographic apparatus.

FIG. 1 is a perspective view showing the outward appearance of a photographic apparatus having a self monitoring device according to the invention. FIGS. 2 through 4 are a front view, a rear view and a righthand side view of the apparatus, respectively.

This apparatus comprises a casing 1 including a bottom plate 2, a front frame 3, a rear plate 4 and a cover 5. The front frame 3 has a protective glass 6, and inwardly of the glass 6 there are provided a photographic lens (a zoom lens in this example) 7 and a cathode-ray tube surface 8a defining a monitor TV screen to be described later. The photographic lens 7 and the CRT 8a are arranged adjacent to each other and facing in the same direction. Number 9 denotes a photographic lamp disposed next to the photographic lens 7 which is lit when a photograph is taken. The protective glass 6 has a rear face blackened as indicated by oblique lines in FIG. 2.

The cover 5 includes a handgrip 10 on its top to render the apparatus portable. As shown in FIG. 4, the righthand side of the casing 1 includes a lockable lid 11 removably attached thereto to cover a film chamber for accommodating a long film, and a pivotable lid 12 hinged thereto to cover a window for operating the photographic lens 7. Number 13 denotes a card receiving slit into which a data card is inserted for identifying a person to be photographed.

As shown in FIG. 3, the rear plate 4 includes an AC source connector 14, fuses 15, 16 and 17 for a power circuit, a still camera and a monitor TV power source, respectively, a signal contact 18 for electronic flash synchronization, a multi-cable connector 19 to which a remote control is connected, volume controls 20-25 for adjusting contrast, brightness, hue, vertical synchronization and horizontal synchronization of the monitor TV, 10 respectively, and a film counter 26.

The bottom plate 2 includes four rubber feet 27 and a threaded opening for attaching a tripod.

Figure 5:
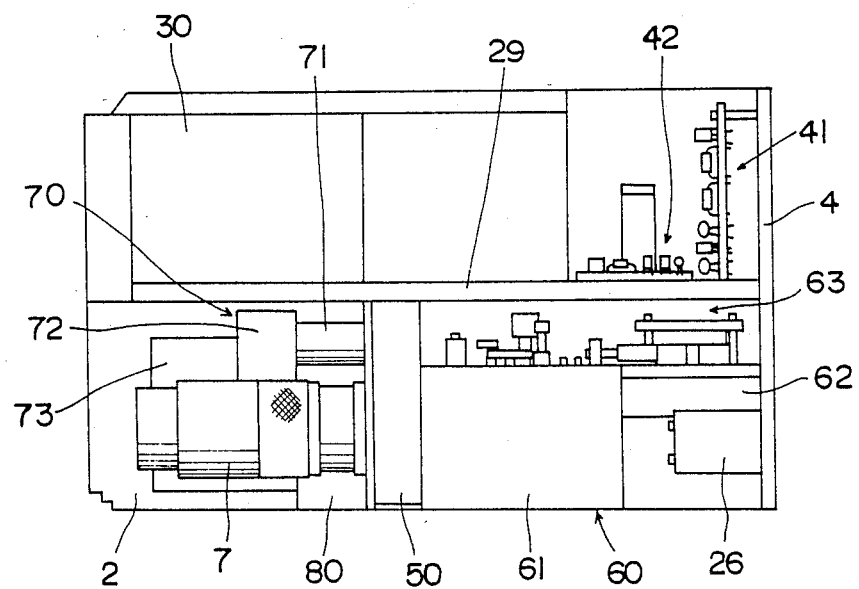
FIG. 5 is a schematic plan view of the photographic apparatus with a cover and a front frame removed to show its interior arrangements.

FIG. 5 is a view having the front frame 3 and cover 5 of the casing removed to show inside elements of the apparatus schematically. As seen, the apparatus includes a partition 29 extending longitudinally along a transversely middle line of the casing 1 to act as a reinforcing member and mounting plate.

On one side of the partition 29 there are provided a monitor TV (a color monitor TV in this example) 30, wiring boards of power circuit 41 and control circuit 42. On the other side of the partition 29 there are provided, in addition to the photographic lens 7, a mirror box 50; a film chamber 61 constituting a still camera body 60; a windup motor 62; a windup interlocking mechanism 63 and the film counter 26 which utilize the power of windup motor 62; a TV camera body 70 including a reduction lens barrel 71, an image forming section 72 and a printed wiring board 73; and a data recording section 80.

Figure 6:
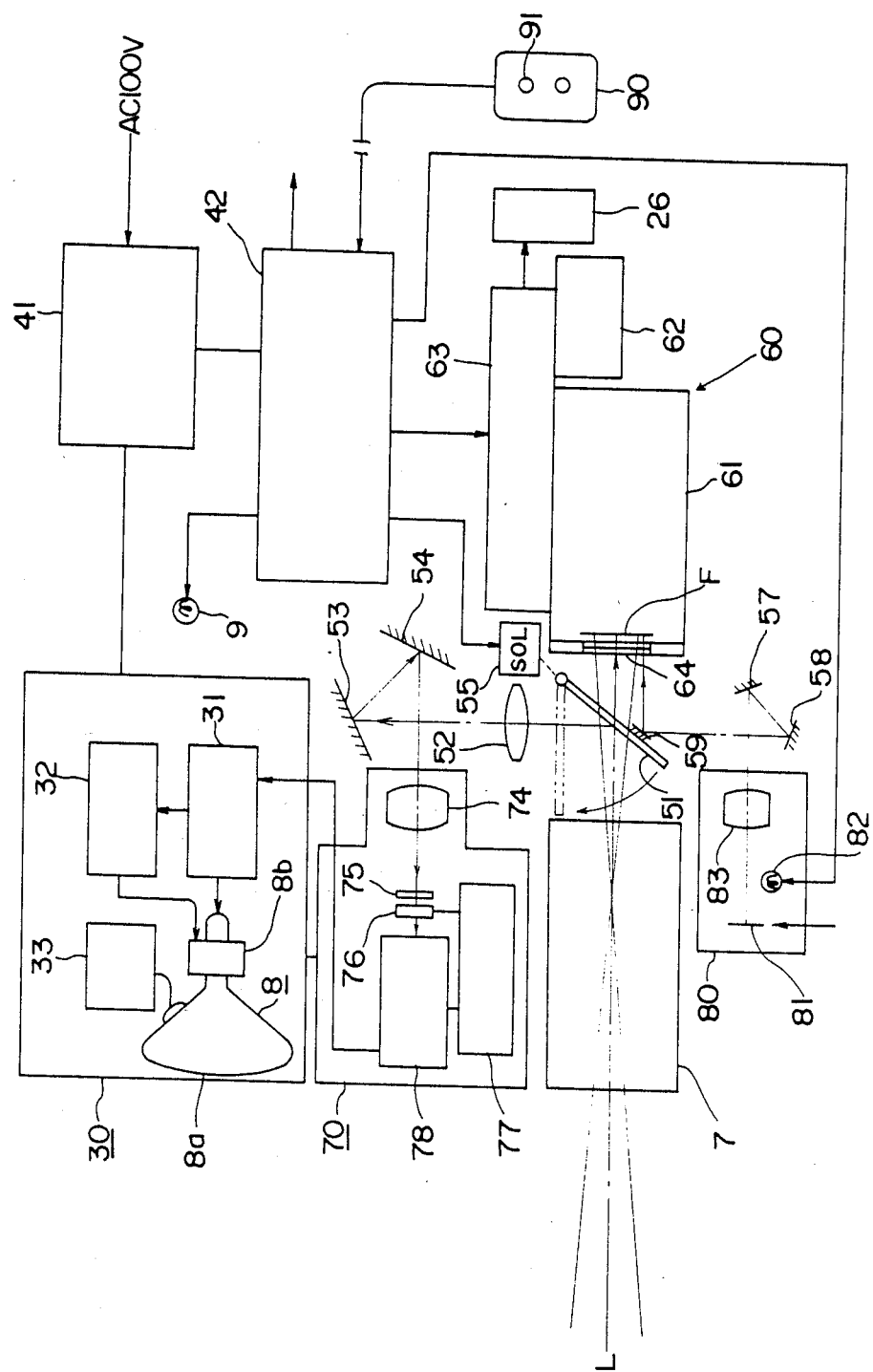
FIG. 6 is a diagrammatic view of an optical and other systems of the photographic apparatus.

How this apparatus operates will be described with reference to FIG. 6 showing an optical and other systems of the apparatus.

A photographic bundle of rays from an object to be photographed enters the apparatus through the photographic lens 7, and is allowed to advance to either the still camera body 60 or the TV camera body 70 by the switching action of a movable mirror 51. In other words, the still camera body 60 and the TV camera body 70 share the photographic lens 7 to constitute a still camera and a TV camera, respectively.

When the movable mirror 51 is inclined 45° with respect to an optical axis L of the photographic lens 7 as shown in solid lines in FIG. 6, the bundle of rays is reflected by the movable mirror 51 sideways at a right angle and forms a space image (real image) by means a vision lens 52 arranged at an equal distance to the movable mirror 51 with a film surface F in the still camera. Thereafter the bundle of rays is reflected by a stationary mirror 53 vertically downwardly with respect to the drawing sheet, and is then reflected by another stationary mirror 54 at a right angle to travel leftward in the drawing. The space image is reduced in scale by a reduction lens 74 mounted in the reduction lens barrel shown in FIG. 5. The reduced image passes through a color filter 75 to be visualized on an image forming surface (or light receiving surface) of a solid image forming element 76 utilizing CCD or charge-coupled devices.

The reason for reducing the image through the reduction lens 74 is that the image forming surface of the solid image forming element is, for example, 6.6×8.8 mm which is smaller than a 24×36 mm photographing frame of the still camera.

Figure 7:
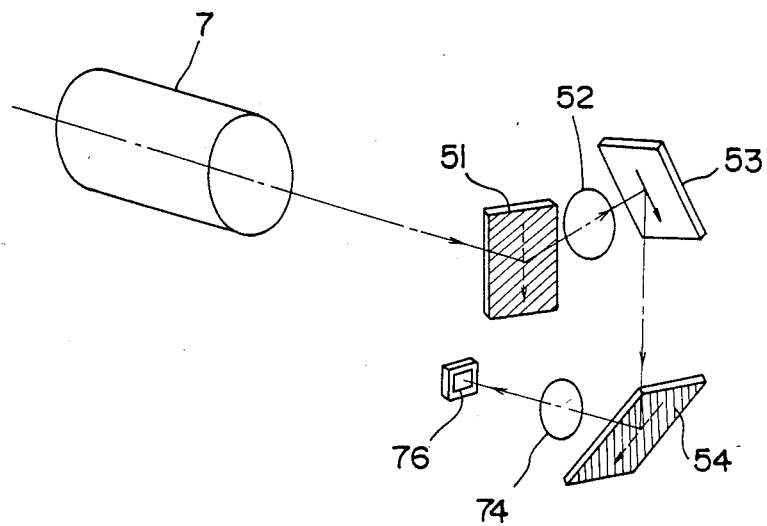
FIG. 7 is a perspective view showing a photographic optical system of a TV camera and its optical path.

FIG. 7 shows, in a three-dimensional scheme, the paths of the photographic bundle of rays and the positional relationship among the described optical elements. It is to be noted that the mirrors 51, 53 and 54 and the vision lens 52 are mounted in the mirror box 50 shown in FIG. 5.

Reverting to FIG. 6, a CCD drive circuit 77 generates transfer pulses to sequentially read out video signals from the solid image forming device 76. A signal processing circuit 78 processes a brightness signal, a color signal and a synchronization signal to output a color video signal of, for example, the NTSC (National Television System Committee) mode. This color video signal is input to an image signal processing circuit 31 of the monitor TV 30 for amplification, synchronous separation, color demodulation and the like. The video signal is then input to the CRT 8 having an anode to which high voltage is applied from a high voltage circuit 33. At the same time a synchronizing and deflecting circuit 32 generates horizontal and vertical deflecting signals and transmits these signals to a deflector coil 8b.

As a result, the image of the object to be photographed appears on the surface or screen 8a of the CRT 8. Since the bundle of rays entering the apparatus through the photographic lens 7 is reflected three times by the mirrors 51, 53 and 54, the image formed on the image forming surface of the solid image forming element 76 is a mirror image of the object, and so is the image appearing on the screen 8a of the monitor TV 30.

Therefore, the person to be photographed can monitor his own image on the screen 8a as though looking at himself in a mirror.

Next, for taking a photograph the photographer, that is the person to be photographed, himself presses a switch 91 on a remote control element 90. This brings the control circuit 42 into operation which lights the photographic lamp 9 first, and actuates a solenoid 55 to pivot the movable mirror 51 to a position shown in phantom lines withdrawn from the optical path of the bundle of ray.

This permits the image of the photographic object or person entering through the photographic lens 7 to be formed on the film surface F. Then a focal plane shutter 64 is opened to the full whereupon the control circuit 42 generates a synchronizing signal for putting an electronic flash in action. After the photograph is taken the shutter 64 is closed.

Thereafter the motor 62 is driven to wind up the film by one frame, charge the shutter and increment the count of the film counter 26 by one.

Figure 8:
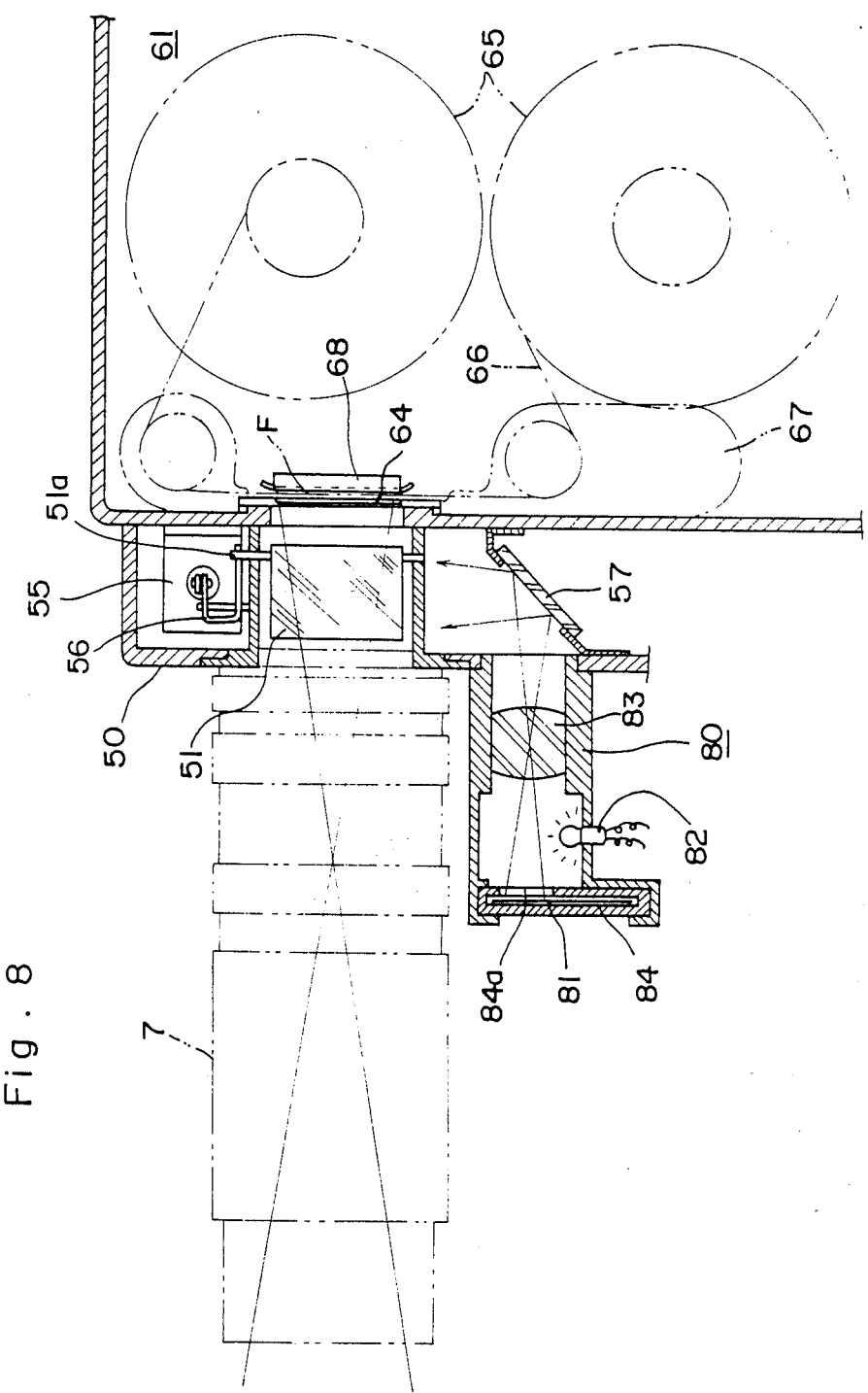
FIG. 8 is a sectional view showing details of a principal portion of a mirror box, a film chamber and a data recording section.

In this embodiment, data for identifying the photographed person are printed, for example, on the righthand margin of the film surface simultaneously with the photograph taking. For this purpose, prior to the photograph taking, a data card 81 bearing identification data in the form of bar code, for example, is inserted through the card insert slit 13 into the data recording section 80 shown in FIG. 4. At the time of photograph taking, the control circuit 42 lights an illumination lamp 82 to irradiate the data card 81. The light reflected by the data card 81 travels through a data recording lens 83 to a first mirror 57 mounted in the mirror box 50 to be reflected vertically upward. The light is further reflected by a second mirror 58 sideways at a right angle and then by a third mirror 59 to travel in a direction parallel to the optical axis L of the photographic lens 7. The light thus directed reaches the righthand margin of the film surface F to record thereon the identification data comprising a bar code. 10 FIG. 8 is a sectional view showing details of a principal portion of the mirror box 50, film chamber 61 and data recording section 80. The movable mirror 51 is supported by a pivotal axis 51a disposed adjacent a deep end of a photographic lens mount in the mirror box 50 to be pivotable within a predetermined range. An angle lever 56 is fixed at an end thereof to the pivotal axis 51a and at the other end thereof to a rod of the solenoid 55. Thus the movable mirror 51 is pivotable by extension and retraction of this rod.

The film chamber 61 of the still camera body contains a pair of film supply and windup spools 65 mounted on spool shafts not shown. The long film 66 wound around the spools 65 is guided through a position between the focal plane shutter 64 and a pressure plate 68, and photographs are taken on one frame after another.

The data recording section 80 includes a guide plate 84 for guiding the data card 81. The guide plate 84 defines a window 84a for exposing only a data-bearing portion of the card 81. It is to be noted that the second and third mirrors 58 and 59 are not shown in FIG. 8.

FIG. 9 shows an example of arrangement for taking photographs utilizing the photographic apparatus having the self-monitoring device. This figure shows the photographic apparatus 100 placed on a table (or a large size tripod) 101, a chair 102, and a suitable number of electronic flashes EF1–EF2. The photographic lens is set beforehand to a zooming ratio and a focal length optimal to taking a photograph of a person seated on the chair 102. The still camera is fixed to a shutter speed synchronizing with flashing (1/60 sec. for example).

When the person 103 to be photographed is seated on the chair 102, he can see his image on the monitor TV 10 which corresponds to the mirror image of his image actually to be photographed, enabling self-monitoring without parallax. He may change the composition of the picture and his pose and then press the switch on the remote control element 90 to take his photograph. At this time the photographic lamp 9 is lit to prompt the photographer to turn his eyes toward the photographic lens 7. This is effective to prevent the eyes from looking away from the lens 7.

In the described embodiment, the photographic bundle of rays is directed to either the still camera body or the TV camera body by the switching action of the movable mirror. Where a sufficient amount of light is provided by using many lamps for lighting the object to be photographed, the bundle of rays may be divided by a half mirror or a beam splitter into two parts to be directed respectively to the still camera body and the TV camera body at all times. This will allow the photographer to monitor his image also during the photograph taking.

The still camera in the described embodiment is suited for a long film to take photographs of many people continually. However, where the photographic apparatus is used for automatically taking photographs for identity cards or the like, the camera may comprise one suited for instant films.

Further, while in the described embodiment the group of three mirrors is employed as means to project a mirror image of the object onto the monitor TV screen, the number of mirrors is not limited to three but may be any number to reflect the image an odd number of times. A mirror image may also be produced electrically by reversing the main scanning direction (horizontal scanning direction) for the image forming surface of the TV camera or of the monitor TV.

The image forming section of the TV camera may include an image forming tube instead of the solid image forming element. The image forming element or tube may of course be provided in a plural number instead of just one.

The data recording function for identifying the 10 photographed object as in the described embodiment enables automatic searches which are convenient, for example, in editing and plate-making work when making albums or in printing additional visiting cards bearing a photograph.

What is claimed is:

1. A self-monitoring photographic apparatus comprising:
   a single lens reflex camera having a still camera body and a photographic lens;
   a TV camera having a CCD as an image forming element;
   an optical lens system in optical alignment with said photographic lens for causing a single image of a photographic object to reach two different positions;
   a monitor TV for forming a TV image from video signals obtained by said TV camera;
   a casing for housing said single lens reflex camera, said TV camera, said optical lens system and said monitor TV;
   said photographic lens and said TV camera being disposed in parallel with each other and forwardly of said still camera body;
   said monitor TV having a screen which is disposed adjacent and directed towards a same view as said photographic lens and within substantially the same plane as a front face of said photographic lens;
   said photographic lens comprising a zoom lens;
   said photographic lens directing an image of a photographic object obtained through said photographic lens towards said optical lens system to said still camera body and to said TV camera, with a focusing and a zooming of the photographic object image directed to said still camera body and to said TV camera being effected commonly by said photographic lens; and
   means being provided for laterally inverting said TV image on said monitor TV screen;
   whereby the same image as the object image obtained by said still camera body is formed on said monitor TV screen as a laterally-inverted image of said object image in synchronism with a still photography to be effected.

2. A photographic apparatus as claimed in claim 1 further comprising a movable mirror switchable between a position to cause a photographic bundle of rays passing through said photographic lens to travel to said TV camera thereby to visualize said photographic object on the monitor TV and a position to cause said bundle of rays to travel to said still camera thereby to permit said object to be photographed.

3. A photographic apparatus as claimed in claim 1 further comprising a half mirror for dividing a photographic bundle of rays passing through said photographic lens to travel, respectively, to said TV camera thereby to visualize said photographic object on the monitor TV and to said still camera thereby to permit said object to be photographed.

4. A photographic apparatus as claimed in claim 1 wherein said still camera is suited for a long film.

5. A photographic apparatus as claimed in claim 1 wherein said still camera is suited for an instant film.

6. A photographic apparatus as claimed in claim 1 wherein said still camera includes means to record data for identifying said photographic object.

7. A photographic apparatus as claimed in claim 1 wherein said means for producing a mirror image of a photographic object comprises a group of mirrors for reflecting said photographic bundle of rays passing through said photographic lens an odd number of times prior to formation of an image on an image forming surface of the TV camera.

8. A photographic apparatus as claimed in claim 1 wherein said means for producing a mirror image of a photographic object comprises means to electrically reverse a scanning direction on one of said image forming surface of said TV camera and said screen of said monitor TV.

9. A photographic apparatus as claimed in 1 wherein said casing includes a handgrip on a top surface thereof.

10. A photographic apparatus as claimed in claim 2 wherein said still camera is suited for a long film.

11. A photographic apparatus as claimed in claim 3 wherein said still camera is suited for a long film.

12. A photographic apparatus as claimed in claim 2 wherein said still camera is suited for an instant film.

13. Aphotographic apparatus as claimed in claim 3 wherein said still camera is suited for an instant film.

14. A photographic apparatus as claimed in claim 2 wherein said still camera includes means to record data for identifying said photographic object.

15. A photographic apparatus as claimed in claim 3 wherein said still camera includes means to record data for identifying said photographic object.

16. A photographic apparatus as claimed in claim 4 wherein said still camera includes means to record data for identifying said photographic object.

17. A photographic apparatus as claimed in claim 5 wherein said still camera includes means to record data for identifying said photographic object.

18. A photographic apparatus as claimed in claim 2 wherein said means for producing a mirror image of a photographic object comprises a group of mirrors for reflecting said photographic bundle of ray passing through said photographic lens an odd number of times prior to formation of an image on an image forming surface of the TV camera.

19. A photographic apparatus as claimed in claim 3 wherein said means for producing a mirror image of a photographic object comprises a group of mirrors for reflecting said photographic bundle of rays passing through said photographic lens an odd number of times prior to formation of an image on an image forming surface of the TV camera.

20. A photographic apparatus as claimed in claim 4 wherein said means for producing a mirror image of a photographic object comprises a group of mirrors for reflecting said photographic bundle of rays passing through said photographic lens an odd number of times prior to formation of an image on an image forming surface of the TV camera.

21. A photographic apparatus as claimed in claim 5 wherein said means for producing a mirror image of a photographic object comprises a group of mirrors for reflecting said photographic bundle of rays passing through said photographic lens an odd number of times prior to formation of an image on an image forming surface of the TV camera.

22. A photographic apparatus as claimed in claim 6 wherein said means for producing a mirror image of a photographic object comprises a group of mirrors for reflecting said photographic bundle of rays passing through said photographic lens an odd number of times prior to formation of an image on an image forming surface of the TV camera.

23. A photographic apparatus as claimed in claim 2 wherein said means for producing a mirror image of a photographic object comprises means to electrically reverse a scanning direction on one of said image forming surface of said TV camera and said screen of said monitor TV.

24. A photographic apparatus as claimed in claim 3 wherein said means for producing a mirror image of a photographic object comprises means to electrically reverse a scanning direction on one of said image forming surface of said TV camera and said screen of said monitor TV.

25. A photographic apparatus as claim in claim 4 wherein said means for producing a mirror image of a photographic object comprises means to electrically reverse a scanning direction on one of said image forming surface of said TV camera and said screen of said monitor TV.

26. A photographic apparatus as claimed in claim 5 wherein said means for producing a mirror image of a photographic object comprises means to electrically reverse a scanning direction on one of said image forming surface of said TV camera and said screen of said monitor TV.

27. A photographic apparatus as claimed in claim 6 wherein said means for producing a mirror image of a photographic object comprises means to electrically reverse a scanning direction on one of said image forming surface of said TV camera and said screen of said monitor TV.

28. A photographic apparatus as claimed in claim 2 wherein said casing includes a handgrip on a top surface thereof.

29. A photographic apparatus as claimed in claim 3 wherein said casing includes a handgrip on a top surface thereof.

30. A photographic apparatus as claimed in claim 4 wherein said casing includes a handgrip on a top surface thereof.

* * * * *

UNITED STATES PATENT AND TRADEMARK OFFICE
CERTIFICATE OF CORRECTION

PATENT NO.  : 4,888,606
DATED       : December 19, 1989
INVENTOR(S) : Kenshiro OTA et al It is certified that error appears in the above-identified patent and that said Letters Patent is hereby corrected as shown below:

Column 2, line  1, delete "still, camera" and insert
                  --still camera--

Column 5, line 13, delete "10"

Column 6, line 18, delete "10"

Column 7, line 31, after "in" insert --claim-- line 56, delete "ray" and insert --rays--

Column 8, line 37, delete "as claim" and insert
                  --as claimed--

Column 5, line 13, "FIG. 8" should begin a new paragraph.

Signed and Sealed this

Twelfth Day of November, 1991

*Attest:*

HARRY F. MANBECK, JR.

*Attesting Officer*        *Commissioner of Patents and Trademarks*